United States Patent

Ciarlo

[11] 3,949,375
[45] Apr. 6, 1976

[54] COMPUTER AUTOMATED INFORMATION SYSTEM

[75] Inventor: Louis A. Ciarlo, Wyckoff, N.J.

[73] Assignee: DMA Data Industries, Inc., Saddle Brook, N.J.

[22] Filed: Oct. 9, 1974

[21] Appl. No.: 513,316

Related U.S. Application Data

[63] Continuation-in-part of Ser. No. 332,515, Feb. 14, 1973, abandoned.

[52] U.S. Cl. .......... 340/172.5; 340/152 R; 340/153; 353/26 A
[51] Int. Cl.[2].. G06F 3/14; G06F 15/40; G06F 3/04; G03B 23/12
[58] Field of Search ........ 340/172.5, 149 R, 149 A, 340/153, 152 R; 353/25, 26, 26 A

[56] References Cited
UNITED STATES PATENTS

| | | | |
|---|---|---|---|
| 3,036,291 | 5/1962 | Whittle | 340/172.5 |
| 3,071,753 | 1/1963 | Fritze | 340/153 |
| 3,242,470 | 3/1966 | Hagelbarger | 340/172.5 |
| 3,505,646 | 4/1970 | Affel | 340/172.5 |
| 3,533,084 | 6/1970 | Cook | 340/172.5 |
| 3,585,597 | 6/1971 | Holmerup | 340/172.5 |
| 3,596,254 | 7/1971 | Highleyman | 340/172.5 |
| 3,596,256 | 7/1971 | Alpert | 340/172.5 |
| 3,622,995 | 11/1971 | Dilks | 340/153 |
| 3,631,403 | 12/1971 | Asbo | 340/172.5 |
| 3,705,384 | 12/1972 | Wahlberg | 340/149 |

*Primary Examiner*—Gareth D. Shaw
*Assistant Examiner*—James D. Thomas

[57] ABSTRACT

A computer automated information system is adapted for use by the public and is installed in public gathering places for readily dispensing information regarding, for example, travel accommodations and the like. The system includes display and print-out components associated with the computer and interfaced for dispensing selected information quickly, accurately and economically, and is modular and compact to minimize maintenance and maximize versatility.

10 Claims, 4 Drawing Figures ns and, particularly to systems of the type described which are adapted for use by the public. More particularly, this invention relates to information systems including information storage, retrieval and display components interfaced for computer control.

COMPUTER AUTOMATED INFORMATION SYSTEM

CROSS REFERENCE TO RELATED APPLICATIONS

This application is a continuation-in-part of U.S. application Ser. No. 332,515, filed by Louis A. Ciarlo on Feb. 14, 1973 and which application is now abandoned.

BACKGROUND OF THE INVENTION

1. Field of the Invention

This invention relates generally to information systems and, particularly to systems of the type described which are adapted for use by the public. More particularly, this invention relates to information systems including information storage, retrieval and display components interfaced for computer control.

2. Description of the Prior Art

The increased mobility of society has given rise to the need for quickly, accurately and economically dispensing information to the traveling public regarding, for example, available restaurant and lodging facilities and/or travel and entertainment accommodations. Prior to the present invention, attempts at accomplishing this task have required costly manned information centers and efforts to reduce costs have resulted in ineffectiveness and inefficiency. The information system of the invention is readily available on a round-the-clock basis and is more effective and efficient and less costly than has heretofore been the case.

SUMMARY OF THE INVENTION

This invention contemplates an information system including microfilm retrieval display equipment, video equipment and keyboard equipment interfaced for computer control. The system operates in a "text" mode whereby the video equipment displays chosen alphanumeric and pictorial information on a programmed timed interval basis and in a "command" mode initiated through the keyboard wherein the microfilm retrieval display equipment is actuated to retrieve and display operator requested information while the video equipment displays alphanumeric and pictorial information related to the request. An optional feature of the invention provides a hard copy printout of the information requested and displayed.

The main object of this invention is to dispense information to the public in an effective, efficient and economical manner.

Another object of this invention is to adapt an information storage, retrieval and display system for use by the public.

Another object of this invention is to interface the storage, retrieval and display components of the system for computer control.

Another object of this invention is to provide a system of the type described which operates in a text mode whereby alphanumeric and pictorial information is displayed on a timed interval basis and in a command mode whereby the system is queried by the user and displays the requested information and alphanumeric and pictorial information related to the request.

Another object of this invention is to provide an optional feature of the invention whereby information requested by the user is provided as a hard print-out.

The foregoing and other objects and advantages of the invention will appear more fully hereinafter from a consideration of the detailed description which follows, taken together with the accompanying drawings wherein several embodiments of the invention are illustrated by way of example. It is to be expressly understood, however that the drawings are for illustration purposes only and are not to be construed as defining the limits of the invention.

DESCRIPTION OF THE INVENTION

DESCRIPTION OF THE INVENTION

Figure 1:
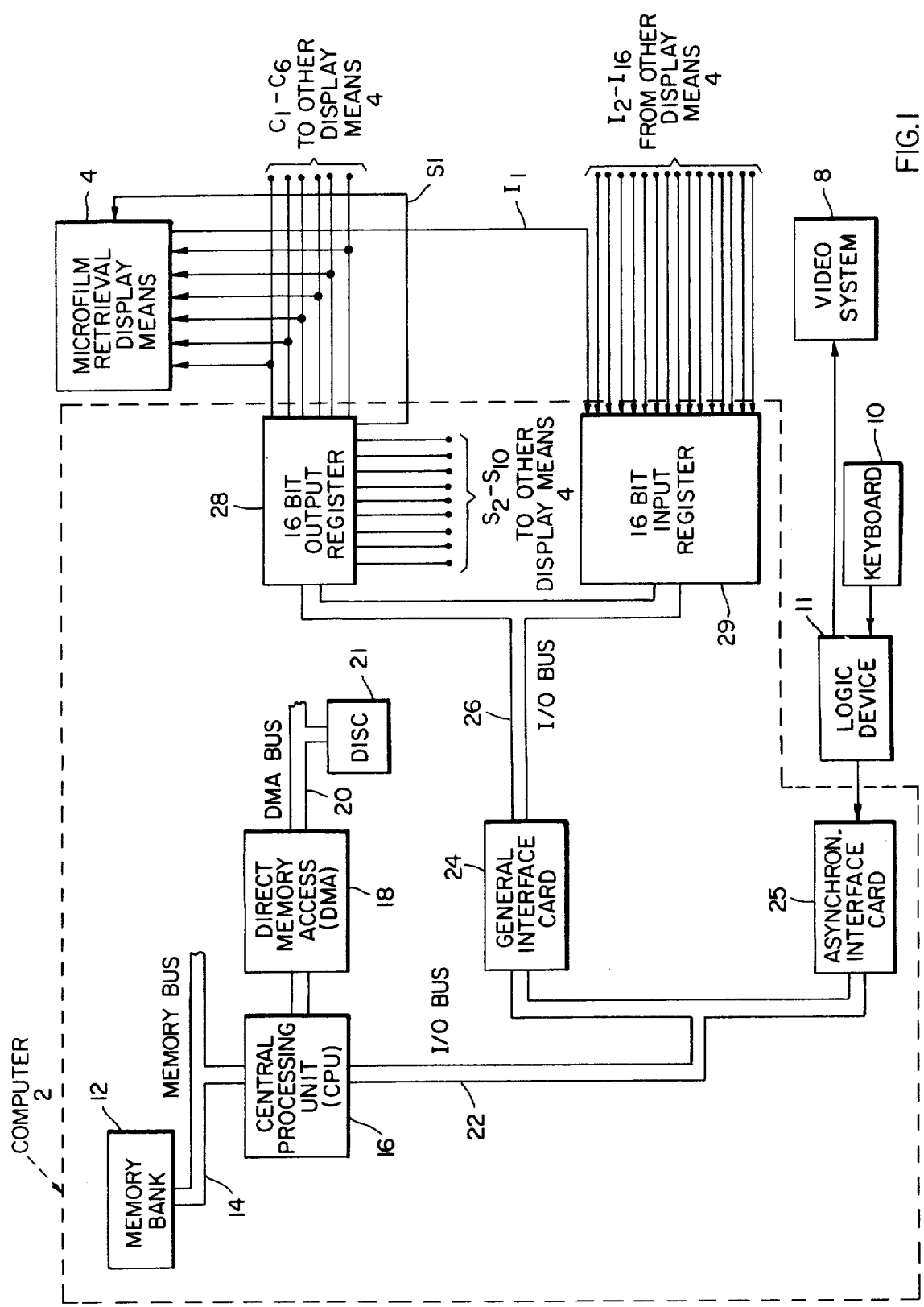
FIG. 1 is a block diagram of the basic system of the invention.

The basic system of the invention as shown in FIG. 1 includes a control computer 2, microfilm retrieval display means 4, a video system 8 and a keyboard 10 which controls computer 2 and video system 8 through a logic device 11. Video system 8 may be a commercially available device such as marketed by Ball Brothers Research Corp., Miratel Division, St. Paul, Minn., and described in their CRT Data Displays Instruction Manual 1M1003 dated Sept. 15, 1972. Logic device 11 may be a device marketed as Memory Timing and Structure and Character Display by Datamedia Corp., Pennsauken, N. J., and described in their Drawing dated Dec. 17, 1971, and which manual and drawing are incorporated herein by reference.

Computer 2 includes a memory bank 11 and a memory bus 14 leading therefrom to a central processing unit (CPU) 16 and to a direct memory access unit (DMA) 18. A DMA bus 20 leads from DMA unit 18 to a memory disc 21.

A programmed input/output (I/O) bus 22 leads from CPU 10 to a general interface card 24 and to an asynchronous interface card 25 connected to logic device 11. An input/output bus 26 leads from card 24 to a 16 bit output register 28 providing six controlling bits $C_1 - C_6$ and 10 select bits $S_1 - S_{10}$. Output register 28 is connected to microfilm retrieval display means 4 for applying controlling functions through bits $C - C_6$ and a select function through bit $S_1$ from the computer to the display means and a 16 bit input register 29 receiving 16 interrupt bits $I_1 - I_{16}$ is connected to display means 4 for applying an interrupt through bit $I_1$ therefrom to computer 2 as will hereinafter become evident. Control bits $C_1 - C_6$ may be applied to other display means 4 selected by bits $S_2 - S_{10}$ and interrupt bits $I_2 - I_{16}$ may be applied from other display means 4 as will be understood with reference to the expanded system of FIG. 3.

As seen from FIG. 1 and as will hereinafter be more fully explained, control of the system of the invention is achieved through computer 2. The system is activated through the computer and all interfacing to and from the computer to external devices is accomplished via I/O bus 22 and interface cards 24 and 25. For this purpose general interface card 24 may be a commercially available device such as marketed as D116 General Purpose Interface by Digital Computer Controls, Inc., Fairfield, N. J. and described in their drawing F400551, revised July 27, 1972. Asynchronous interface card 25 may be a commercially available device such as marketed as Asynchronous Data Control By Digital Equipment Corp., Maynard, Mass., and described in their drawing dated Apr. 2, 1971, and which drawings are incorporated herein by reference.

Figure 2:
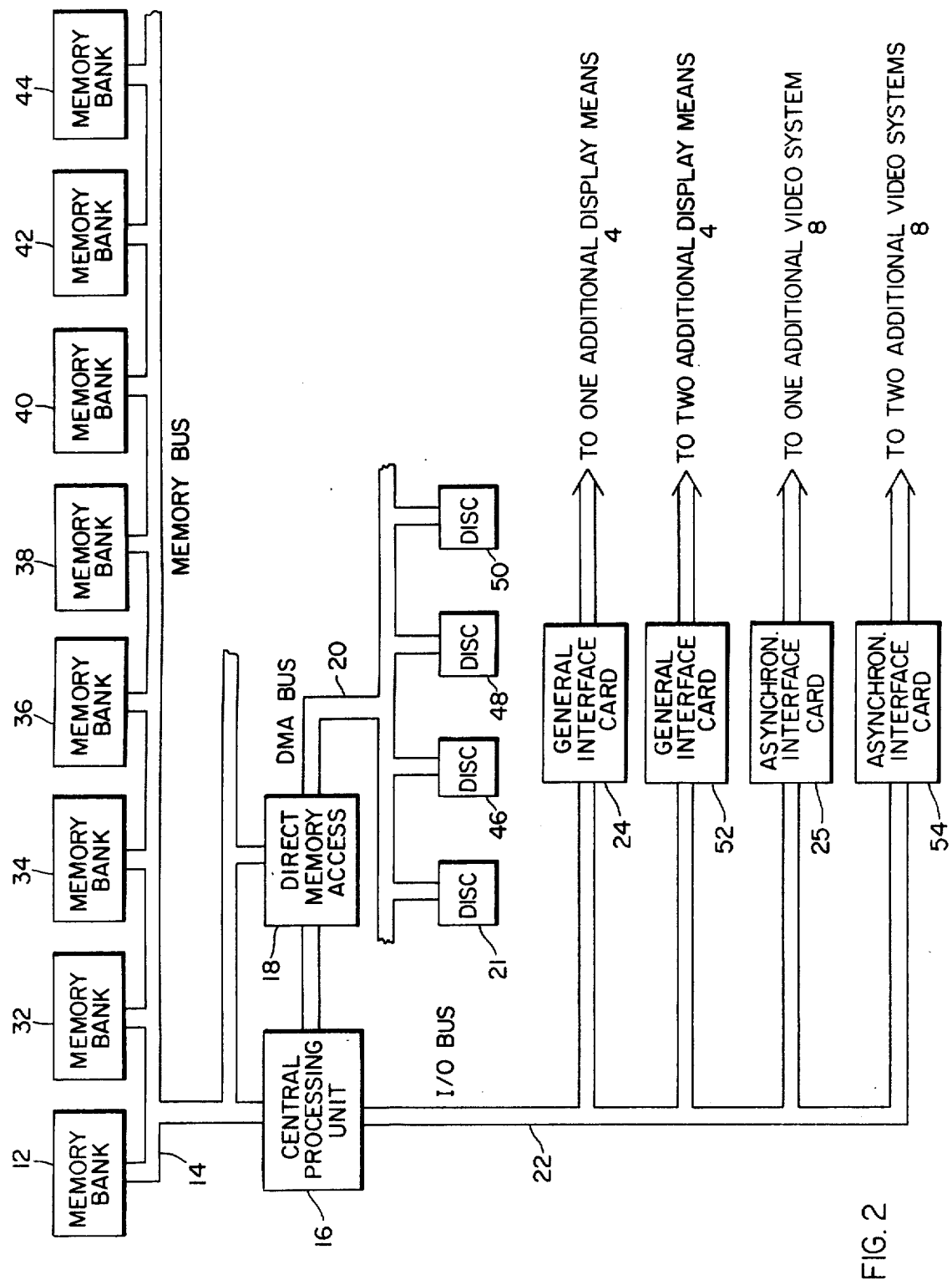
FIG. 2 is a block diagram showing the basic system of FIG. 1 expanded according to the invention.

FIG. 2 shows an expanded system whereby memory bus 14 leads to memory bank 12 as well as to additional memory banks 32, 34, 36, 38, 40, 42 and 44 and DMA bus 20 leads to memory disc 21 and to additional memory discs 46, 48 and 50.

I/O bus 22 leads to general interface card 24 and to an additional general interface card 52, and to asynchronous interface card 25 and to an additional asynchronous card 54. In the expanded system as shown in FIG. 2, interface card 24 leads through a suitable input register (not shown) such as register 29 to an additional display means 4 (not shown). Likewise, general interface card 52 may lead to two additional such display means. Interface card 25 is connected to an additional logic device such as device 11 (not shown). Likewise, card 54 may lead to two additional such logic devices and video systems. The number of additional components in the expanded system is shown by way of illustration and not by way of limitation. Further expansion of the system to accommodate additional video systems and display means will now be within the scope of those skilled in the art.

Figure 3:
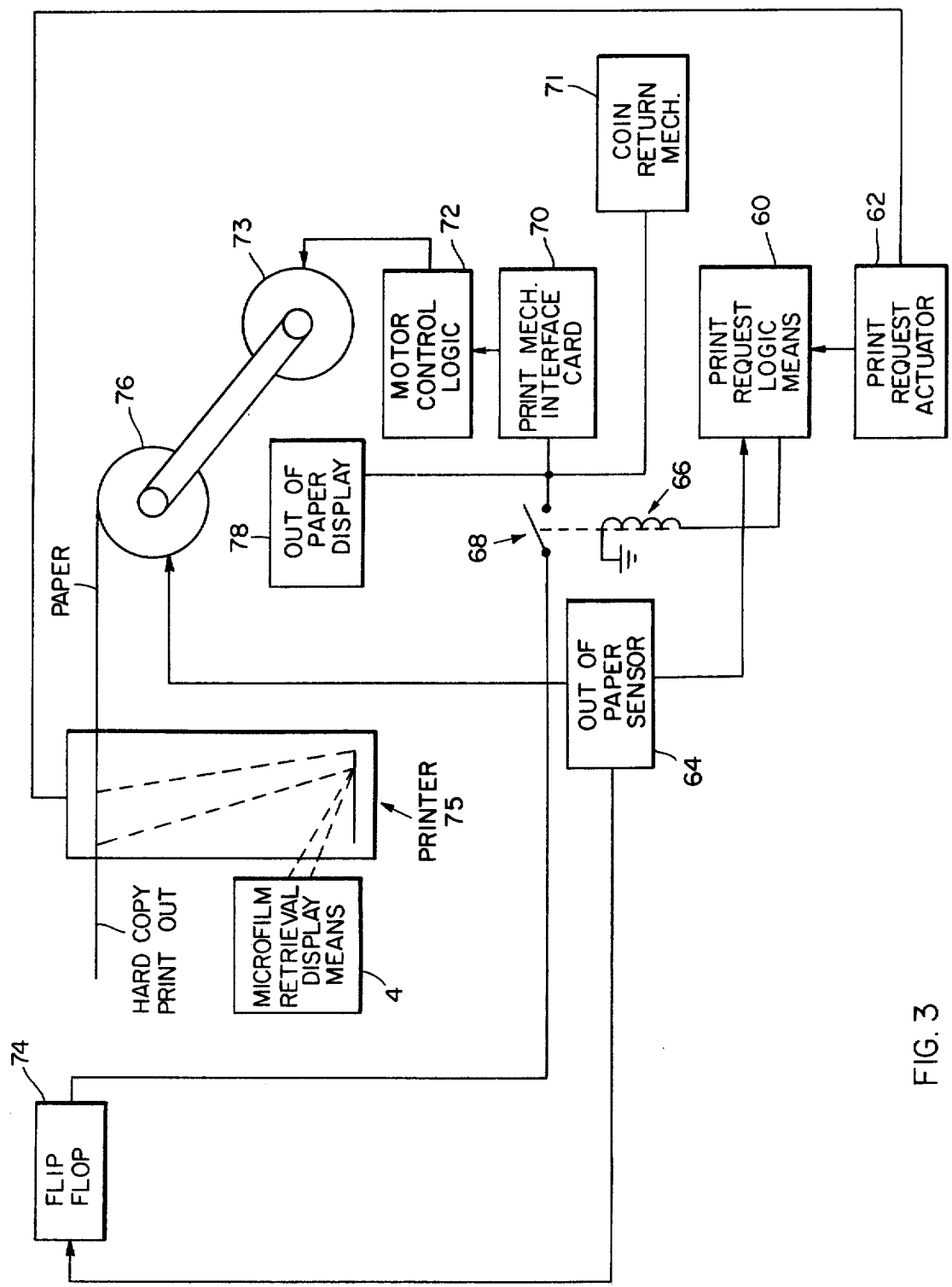
FIG. 3 is a schematic-block diagram showing the optional print-out of the invention.

FIG. 3 illustrates the optional print-out feature of the invention. Print request logic means 60 and a printer 75 are operated by a print request activator 62 which may be a push button or coin actuated means. Print request logic means 60 is connected to an out-of-paper sensor 64 and is connected to a relay 66 which operates a normally open switch 68 connecting a flip-flop 74 to a print mechanism interface card 70. Interface card 70 interfaces motor control logic 72 for controlling a motor 73 which rotates a reel of paper 76 having an end thereof suitably arranged with printer 75.

When a print request is made through activator 62, print request logic means 60 operates relay 66 to close switch 68. Motor control logic 72 is thereupon activated by flip-flop 74 through interface card 70. Print request logic means 60 always checks out-of-paper sensor 60 which is suitably connected to reel 76. With switch 68 closed, the output of flip-flop 74 in one state drives motor control logic means 72 through interface card 70 and a hard-copy print-out of what is currently displayed by microfilm retrieval display means 4 will be provided by printer 75.

Out of paper sensor 64 is connected to flip-flop 74. Whenever the paper supply is exhausted, flip-flop 74 will be triggered so that the output therefrom in its other state is ineffective for driving interface card 70, and is effective for operating an out-of-paper display or indicating device 78 which may be an indicator light or the like, and may operate a coin return mechanism 71. Whenever additional paper is added, sensor 64 will set flip-flop 74 to its initial state for providing an output which is effective for driving interface 70 as heretofore noted. Print request logic means 61, connected to out-of-paper sensor 64, will not operate relay 66 to close switch 68 if the paper supply is exhausted.

Figure 4:
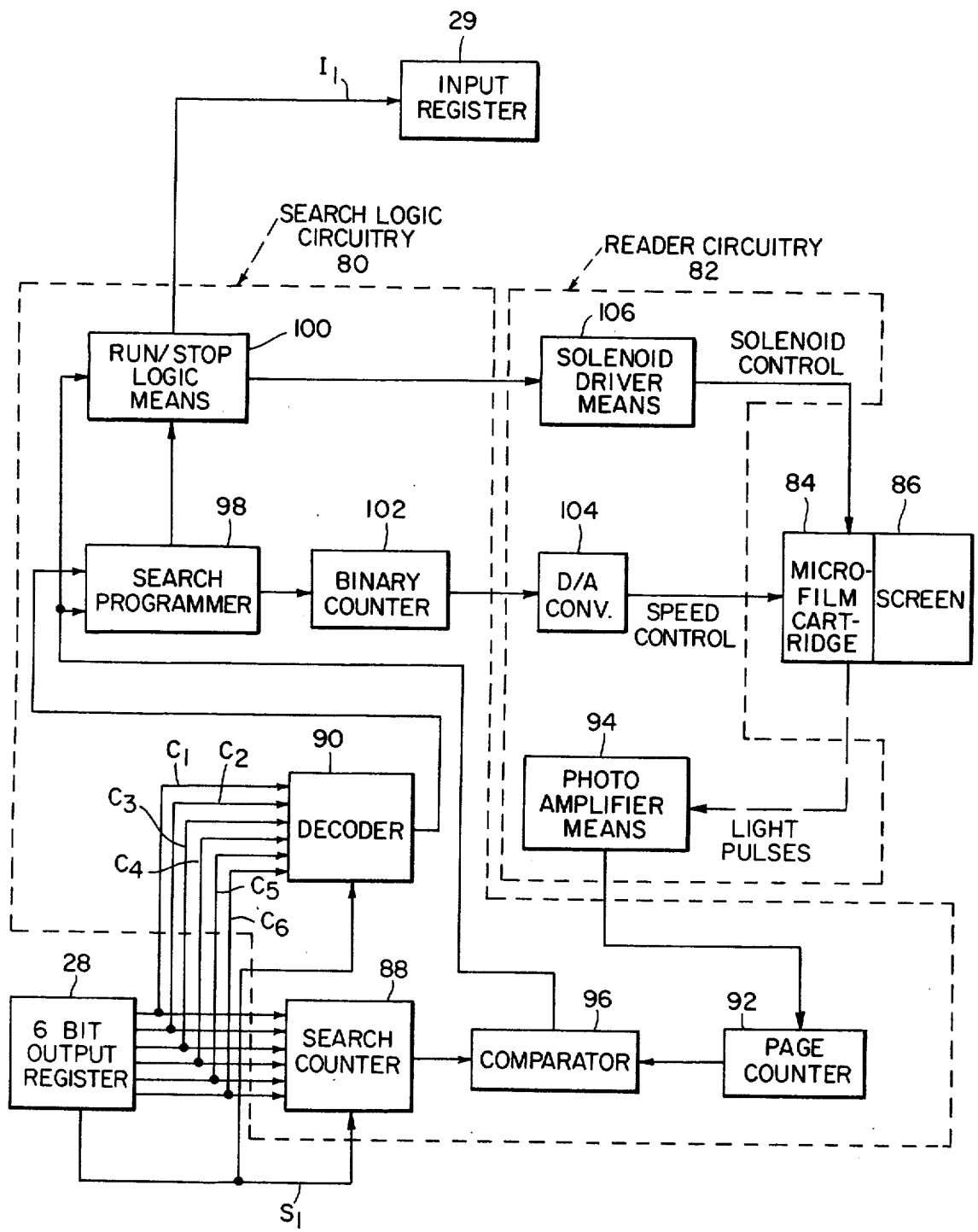
FIG. 4 is a block diagram showing microfilm retrieval display equipment according to the invention.

Microfilm retrieval display means 4 is shown in FIG. 4 as including search logic circuitry 80, reader circuitry 82 and a microfilm cartridge 84 arranged with a reader screen 86. For this purpose microfilm retrieval display means 4 may be a commercially available device such as marketed by Reproduction Systems, Inc., San Francisco, Calif., and described in their Northstar 1A Service Manual copyrighted 1970 and which manual is incorporated herein by reference.

The six control bits $C_1 - C_6$ and the select bit $S_1$ from output register 28 are applied to a search counter 88 and to a decoder 90 in search logic circuitry 80. A page counter 92 included in said circuitry is driven by photo amplifier means in reader circuitry 82 as will be hereinafter explained. A comparator 96 in logic circuitry 80 compares the outputs from search counter 88 and page counter 92 and the resulting comparator output is applied to a search programmer 98 as is the output from decoder 90. The output from comparator 96 is applied to run/stop logic means 100 as is an output from search programmer 98. Run/stop logic means 100 provides an interrupt $I_1$ to input register 29 when a display or reader sequence has been completed. Search programmer 98 may be a commercially available device such as marketed by the aforenoted Reproduction Systems, Inc., and described in their Preliminary Service Manual (Reference Sketch 4) for Northstar 2, Keyboard Microfilm Retrieval display dated Feb. 9, 1972, and which manual is incorporated herein by reference.

An output from search programmer 98 is applied to a binary counter 102 which drives a digital to analog converter 104 in reader circuitry 82. Converter 104 provides a speed control output which is applied to microfilm cartridge 84.

Run/stop logic means 100 provides an output which is applied to solenoid driver means 106. Solenoid driver means 106 provides a controlling output from microfilm driving solenoids (not shown).

Microfilm cartridge 84 is of the standard type capable of accepting 16 mm original or duplicated microfilm with effective reduction of $27.5x-0.5x$ referred to an 11×14 inch page. Microfilm image size and position conforms to Comic or Cine Film layout requirements. The microfilm leader is automatically threaded upon insertion of the cartridge.

Photoamplifier 94 includes three two stage photoamplifiers, with each stage having a light emitting diode showing the state of the output. Logic following two of the amplifiers provides a clocked count-up pulse everytime a microfilm image count mark goes by in the advancing direction and provides a clocked count-down pulse everytime an image count mark goes by in the reverse direction. The third amplifier provides a pulse when a page is in the center of the screen. The pulses from photoamplifier means 94 actuate page counter 92 which is capable of counting 1 through 1,999 pages.

Digital to analog converter 104 is effective for providing microfilm speed control and uses an operational amplifier in a current summing mode. For zero speed, the output of the converter is at +5 volts and for full speed the output is at +10 volts. Binary Counter 102 controls converter 104. If a page is searched which is more than 64 pages away from the present page as indicated by search programmer 98, the counter is incremented until top speed is achieved. As soon as the microfilm is within 64 pages the counter is decremented, which decreases the film speed until the search page is reached.

The output bits from output register 28 are applied to search counter 88 which includes a pair of decades for handling the output bits. Comparator 96 compares the outputs from search counter 88 and page counter 92. If there is no difference between the compared outputs, the microfilm is at the desired page and no further action is required. If the search counter has a higher output, comparator 96 drives solenoid logic means 106 through run/stop logic means 100 so that the microfilm advances. If the search counter output is less than the page counter output the microfilm is reversed. Comparator 96 also controls search programmer 98 in conjunction with the output bits from register 28 decoded by decoder 90.

DESCRIPTION OF THE OPERATION

The system of the invention operates in "text" and "command" modes. In the text mode, no one is requesting information and video system 8 displays selected alphanumeric and pictorial information on a programmed timed interval basis. The information is displayed until a request to retrieve certain information is entered by a user through keyboard 10, whereupon logic device 11 feeds the keyboard information back to computer 2 to render the system in the command mode.

Upon initiating the command mode, an initial narrative will be shown by microfilm retrieval display means 4, after which it will be led through a series of displays until the requested information is reached. Video system 8 provides a pictorial/alphanumeric display related to the requested information such as listing, index, etc. At this point the user may optionally select a hard-copy print-out of the requested data in accordance with the feature of the invention shown in FIG. 3. If, while in the command mode, the user does not exercise the print-out option with a specified time, the system will automatically revert to the text mode.

Asynchronous interface cards 25 and 54 shown in FIGS. 1 and 2 and heretofore referred to as commercially available devices are of the type including a receiver and a transmitter. The transmitter may include a data buffer register which receives a data character from central processing unit 16 through the system input line (22). The buffer register is thus loaded which in turn sets a flip-flop to a logic "1" state. The character so received is then shifted to the system output line (22) setting the flip-flop to a logic "0" state. This permits central processing unit 16 to reload the data buffer register in the asynchronous interface card. The data is shifted out of the data buffer register serially to the system output line.

The flip-flop heretofore referred to is automatically set to the logic "1" state when the data buffer register receives a character and it is automatically cleared when the register is emptied. The flip-flop is set to the logic "0" state when the received character is shifted to the system output line, whereupon the data buffer register is ready to accept another data character.

During transmission, characters are sent to asynchronous interface cards 25 and 54 where they are prefixed with a start bit and appended with a parity bit. A stop bit is added and the character is shifted serially to logic device 11 shown in FIG. 1. -

During reception of data, the receiver included in asynchronous interface cards 25 and 54 receives incoming characters which are first checked for start bit verification. Upon verification of a valid start bit, the start and stop bits are then stripped from the data character and the character is loaded into central processing unit 16. The receiver included in asynchronous interface cards 24 and 54 has a data register which receives serial data from logic device 11 and when a full character has been received a flip-flop is set to a logic "1" state. The character is then transmitted from the data buffer register to central processing unit 16. The flip-flop remains in the logic "1" state until a clear or start command is issued.

General interface cards 24 and 52 shown in FIGS. 1 and 2 and heretofore referred to as commercially available devices transmit and receive data from microfilm retrieval display means 4 shown in FIG. 1 via register 28 and 29 and input/output line 26. The general interface cards have receiving and transmitting functions associated therewith similar to those previously described with reference to asynchronous interface cards 25 and 54. The transmitting function of the general purpose interface cards employs 16 bit output register 28 shown in FIG. 1. The data is loaded through central processing unit 16, thus driving a flip-flop in the general interface card to a logic "0" state and another flip-flop to a logic "1" state. This indicates that output register 28 is empty and can again be loaded for transmission of data to microfilm retrieval display means 4.

The receiving function of the general interface cards operates in a similar manner. The data is loaded into input register 29 from microfilm display means 4, thus setting the aforementioned flip-flops to their opposite states whereupon the data is loaded into central processing unit 16.

Logic device 11 shown in FIG. 1 and heretofore described as a commercially available device is of the type including a memory unit having MOS dynamic dual, 512 bit shift registers. The device is of the type wherein the memory can be arranged in seven different formats: 64 character, 8 lines; 64 character, 16 lines; 64 character; 24 lines; 80 character, 12 lines; 80 character, 18 lines; and 80 character, 24 lines. Thus, the 80 character format has a maximum number of 1920 displayable characters and the 64 character format has a maximum number of 1536 displayable characters. This data is then transmitted to video system 8 shown in FIG. 1 through a UHF path.

Logic device 11 includes an input buffer register which receives data transmitted via asynchronous interface cards 25 and 54 in a serial manner and handles all data to memory. Logic device 11 further includes an output buffer register which handles data in either a full or half duplex mode. In the full duplex mode, the output buffer register controls data transmission from keyboard 10 (FIG. 1) to the system output line and to asynchronous interface cards 25 and 54. In the half duplex mode, data transmission is controlled from keyboard 10 to the output line and to the input buffer register.

Video system 8 shown in FIG. 1 and heretofore described as a commercially available device receives data from logic device 11. The video system employs conventional raster-scan techniques. At 60 HZ. a 520 line system is provided and at 50 HZ. a 600 line system is provided as will be understood by those skilled in the art. Video system 8 requires three drive signals; vertical sync, horizontal sync, and video. System 8 is responsive to the end result of the timing and memory functions of logic device 11.

Microfilm display means 4 shown in FIG. 1 and heretofore described as a commercially available device accepts data from general purpose interface cards 24 and 52 and transmits the data to search counter 88 and decoder 90 shown in FIG. 4. Decoder 90 decodes the data to determine if the data is functional data or not. Functional data places the system in one of the following modes, i.e. (a) system clear: this will clear all pending activities within the system and return the system to its previous state; (b) system store: when in this mode the last five nonfunctional code characters transmitted will be stored within search ounter 88; (c) rewind mode: when the system is in the rewind mode data received will rewind the microfilm in microfilm cartridge 84 to a beginning or start point; (d) read mode: when the system is in the read mode the functional code will take the previous data and start search programming means 98; (e) back space mode: when the system is in this mode it will back space one record; (f) forward space mode: when the system is in this mode it will forward space one record.

When one of any of the above modes is completed, the system will be notified by transmitting a signal to the general purpose interface cards via line S1 shown in FIG. 1. This signal will, in turn, be transmitted to central processing unit 16 via input/output line 22 so that appropriate action may be taken by the system.

Search programmer 98 shown in FIG. 4 and heretofore described as a commercially available device receives a search signal from general interface cards 24 and 52. The search programmer makes a comparison between the outputs of search counter 98 and page counter 92 via comparator 96. The comparison thus provided has three possibilities: (a) the comparison is such that the film in microfilm cartridge 84 is already at the desired page so no further action is taken; (b) the comparison is such that search counter 88 has a higher number than page counter 92 which advances microfilm cartridge 84 to the desired record; (c) search counter 88 has a lower number than page counter 92 which reverses the microfilm cartridge to the desired record.

It will now be seen that the aforenoted objects of the invention have been met. Information is dispensed to the public in an effective, efficient and economical manner, System storage, retrieval and display components are interfaced for computer control. The system operates in text and command modes and a hard-copy print-out of information displayed in the command mode is available.

Although several embodiments of the invention have been illustrated and described, various changes in the form and relative arrangements of the parts, which will now appear obvious to those skilled in the art, may be made without departing from the scope of the invention. Reference is therefor to be had to the appended claims for a definition of the limits of the invention.

What is claimed is:

1. An information storage, processing, retrieval and display system comprising:
   information storage and processing means;
   first and second interfacing means connected to the storage and processing means;
   user operated keyboard means connected to the first interfacing means for transmitting information requests through said interfacing means to the storage and processing means;
   output register means connected to the second interfacing means for receiving information through said interfacing means from the storage and processing means in accordance with the information requests;
   information retrieval and display means connected to the output register means and driven thereby for retrieving and displaying information in accordance with the information requests;
   printing means associated with the information retrieval and display means for printing the retrieved and displayed information;
   the printing means including a print request actuator operated by the user for providing a print request output, a printer connected to the print request actuator and actuated by the output therefrom, a supply of paper and means connected to the print request actuator and to the supply of paper and responsive to the print request output for actuating the supply of paper into cooperative relation with the printer whereupon the printer prints the retrieved and displayed information;
   said means for actuating the supply of paper including a flip-flop, print interfacing means connected through a normally open switch to the flip-flop, control means connected to the supply of paper and to the print interfacing means, logic means connected to the print request actuator and responsive to the print request output for operating a relay to close the normally open switch, the output of the flip-flop in one state being applied through the closed switch to the print interfacing means, and effective for driving said means to activate the control means for actuating the supply of paper into cooperative relation with the printer to print the retrieved and displayed information; and
   input register means connected to the retrieval and display means and to the second interfacing means for applying an interrupt from the retrieval and display means through said interfacing means to the storage and processing means when a retrieval and display sequence has been completed.

2. A system as described by claim 1, including:
   logic means connecting the keyboard means to the first interfacing means;
   a video system connected to the logic means and driven thereby prior to operation of the keyboard means for displaying selected alphanumeric and pictorial information; and
   the logic means being effective upon operation of the keyboard means for applying the information requests to the first interfacing means for transmittal to the storage and processing means and for driving the video system to display alphanumeric and pictorial information related to the information requests.

3. A system as described by claim 1, including:
   an out of paper sensor connected to the supply of paper for sensing an out-of-paper condition and connected to the flip-flop for thereupon triggering the flip-flop to provide an output in another state; and
   said output in another state being ineffective for driving the print interface means.

4. A system as described by claim 3, wherein:
   the out-of-paper sensor is connected to the logic means and responsive to an out-of-paper condition for rendering said means unresponsive to the print request output.

5. A system as described by claim 3, including:
   indicating means connected to the switch; and
   the indicating means being responsive to the flip-flop output in another state for indicating an out-of-paper condition.

6. A system as described by claim 3, wherein:

the print request actuator is a coin actuated means; and coin return means is connected to the switch and responsive to the flip-flop output in another state applied therethrough for returning the coin when an out-of-paper condition exists.

7. An information storage, processing, retrieval and display system comprising:

information storage and processing means;

first and second interfacing means connected to the storage and processing means;

user operated keyboard means connected to the first interfacing means for transmitting information requests through said interfacing means to the storage and processing means;

output register means connected to the second interfacing means for receiving information through said interfacing means from the storage and processing means in accordance with the information requests;

information retrieval and display means connected to the output register means and driven thereby for retrieving and displaying information in accordance with the information requests;

the information retrieval and display means including;

information search logic means connected to the output register means and driven thereby for retrieving information in accordance with the information requests;

reader means connected to the information search logic means and driven thereby for providing controlling outputs;

a microfilm and screen arrangement associated with the reader means and controlled by the controlling outputs therefrom for displaying the retrieved information; and input register means connected to the retrieval and display means and to the second interfacing means for applying an interrupt from the retrieval and display means through said interfacing means to the storage and processing means when a retrieval and display sequence has been completed.

8. A system as described by claim 7, wherein:

the input register means is connected to the search logic means and to the second interfacing means for applying an interrupt through said interfacing means when a retrieval and display sequence has been completed.

9. A system as described by claim 8, wherein:

the output register means provides a plurality of control bits and another plurality of select bits; and the retrieval and display means includes a plurality of retrieval and display devices each of which is selected by one of the select bits and driven by the plurality of control bits for retrieving and displaying information in accordance with the information requests.

10. A system as described by claim 9, wherein:

the input register means is connected to the plurality of retrieval and display devices and to the second interfacing means for applying interrupts from the devices through the interfacing means to the storage and processing means when said devices complete a retrieval and display sequence.

* * * * *